(12) United States Patent
Lee et al.

(10) Patent No.: US 12,509,369 B2
(45) Date of Patent: Dec. 30, 2025

(54) WATER PRODUCTION FACILITY AND METHOD OF REPLACING ION EXCHANGE RESIN

(71) Applicant: Samsung Electronics Co., Ltd., Suwon-si (KR)

(72) Inventors: Yongjai Lee, Seoul (KR); Sanghoon Yoo, Cheonan-si (KR); Huchul Lee, Hwaseong-si (KR); Byungchan Choi, Hwaseong-si (KR); Jieun Jang, Pyeongtaek-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 394 days.

(21) Appl. No.: 18/171,757

(22) Filed: Feb. 21, 2023

(65) Prior Publication Data

US 2023/0264987 A1     Aug. 24, 2023

(30) Foreign Application Priority Data

Feb. 21, 2022   (KR) ........................ 10-2022-0022456

(51) Int. Cl.
*C02F 1/42* (2023.01)
*C02F 103/04* (2006.01)

(52) U.S. Cl.
CPC ............ *C02F 1/42* (2013.01); *C02F 2103/04* (2013.01); *C02F 2201/005* (2013.01);
(Continued)

(58) Field of Classification Search
None
See application file for complete search history.

(56) References Cited

U.S. PATENT DOCUMENTS

| | | | | |
|---|---|---|---|---|
| 4,304,389 A | * | 12/1981 | McLeod | ............... F15B 11/072 |
| | | | | 251/29 |
| 11,392,046 B2 | | 7/2022 | Kamimura | |

(Continued)

FOREIGN PATENT DOCUMENTS

| | | |
|---|---|---|
| CN | 112203988 A | 1/2021 |
| JP | H0231839 A | 2/1990 |

(Continued)

OTHER PUBLICATIONS

Machine translation of JP6315611B2 (equivalent of JP2017100055A) (Year: 2025).*

(Continued)

*Primary Examiner* — Jennifer Dieterle
(74) *Attorney, Agent, or Firm* — Fish & Richardson P.C.

(57) ABSTRACT

An ultrapure water (UPW) production facility includes a polisher filled with an ion exchange resin, an inflow line, an inflow valve connected to the inflow line and upstream of the polisher, an outflow line, an outflow valve connected to the outflow line and downstream of the polisher, a first drain line connected to the polisher, a first drain valve connected to the first drain line and downstream of the polisher, a second drain line branched from the outflow line, a second drain valve connected to the second drain line, a discharge line branched from the second drain line, a discharge valve connected to the discharge line, wherein the inflow valve, the outflow valve, the first drain valve, the second drain valve, and the outflow valve are automatic valves.

19 Claims, 4 Drawing Sheets

(52) U.S. Cl.
CPC ...... *C02F 2209/20* (2013.01); *C02F 2209/22* (2013.01); *C02F 2209/44* (2013.01); *C02F 2303/16* (2013.01)

(56) References Cited

U.S. PATENT DOCUMENTS

| | | | |
|---|---|---|---|
| 2012/0139725 | A1* | 6/2012 | Grumstrup .......... F16K 37/0091 702/183 |
| 2022/0388880 | A1 | 12/2022 | Sasaki et al. |

FOREIGN PATENT DOCUMENTS

| | | | |
|---|---|---|---|
| JP | H0445855 | A | 2/1992 |
| JP | 3176762 | B2 | 6/2001 |
| JP | 2002-066341 | A | 3/2002 |
| JP | 4078192 | B2 | 4/2008 |
| JP | 2011-050898 | A | 3/2011 |
| JP | 6000045 | B2 | 9/2016 |
| JP | 2017100055 | A * | 6/2017 |
| JP | 6315611 | B2 * | 4/2018 |
| JP | 6751446 | B2 | 9/2020 |
| KR | 100190546 | B1 | 6/1999 |
| KR | 10-2005-0062983 | A | 6/2005 |
| KR | 100713249 | B1 | 5/2007 |
| KR | 20120113913 | * | 10/2012 |
| KR | 10-2013-0087858 | A | 8/2013 |
| KR | 101682874 | B1 | 12/2016 |
| KR | 10-2021-0018207 | A | 2/2021 |
| TW | 202116686 | A | 5/2021 |
| TW | 202200508 | A | 1/2022 |

OTHER PUBLICATIONS

Translation of KR20120113913 from global dossier run Sep. 10, 2025.*
Korean Notice of Allowance dated Mar. 2, 2023 issued in corresponding Korean Appln. No. 10-2022-0022456.
Korean Notice of Allowance dated Aug. 5, 2024 issued in corresponding Korean Appln. No. 10-2023-0052986.
Taiwanese Office Action dated Nov. 6, 2024 issued in corresponding Taiwanese Patent Appln. No. 112106132.
KR Office Action dated Nov. 9, 2022 issued in corresponding KR Application No. 10-2022-0022456.

* cited by examiner

WATER PRODUCTION FACILITY AND METHOD OF REPLACING ION EXCHANGE RESIN

CROSS-REFERENCE TO RELATED APPLICATION

This application is based on and claims priority under 35 U.S.C. § 119 to Korean Patent Application No. 10-2022-0022456, filed on Feb. 21, 2022, in the Korean Intellectual Property Office, the disclosure of which is incorporated by reference herein in its entirety.

BACKGROUND

The inventive concepts relate to an ultrapure water (UPW) production facility. More particularly, the inventive concepts relate to an UPW production facility capable of reducing errors that may occur by manually performing processes before and after replacing an ion exchange resin. UPW is water having a specific resistance greater than or equal to 18 MQ·cm theoretically. As the degree of integration of semiconductor devices increases, highly purified UPW is required in a semiconductor manufacturing process. On the other hand, in order to remove various ions from UPW, an ion exchange resin is used. As an UPW production process is repeatedly performed, the ion exchange resin needs to be replaced. Accordingly, there may be a problem in that errors occur due to a manual operation of an operator during a process of replacing ion exchange resins, which leads to deterioration of the quality of the UPW treated by the ion exchange resin.

SUMMARY

The inventive concepts provide an ultrapure water (UPW) production facility capable of reducing various errors that may occur when ion exchange resins are replaced by a manual operation of an operator, and securing the quality of UPW treated with the replaced ion exchange resins.

The inventive concepts provide a method for replacing ion exchange resins capable of improving various errors that may occur when ion exchange resins are replaced by a manual operation, and securing the quality of UPW treated by the replaced ion exchange resin.

According to an aspect of the inventive concepts, there is provided an ultrapure water (UPW) production facility including a polisher filled with an ion exchange resin, an inflow line configured to allow water to be treated to flow into the polisher, an inflow valve connected to the inflow line and upstream of the polisher, an outflow line configured to allow the water to be treated to flow out from the polisher, an outflow valve connected to the outflow line and downstream of the polisher, a first drain line connected to the polisher, a first drain valve connected to the first drain line and downstream of the polisher, a second drain line branched from the outflow line, a second drain valve connected to the second drain line, a discharge line branched from the second drain line, a discharge valve connected to the discharge line, wherein the inflow valve, the outflow valve, the first drain valve, the second drain valve, and the discharge valve are automatic valves.

According to another aspect of the inventive concepts, there is provided an ultrapure water (UPW) production facility including a polisher filled with an ion exchange resin, an inflow line configured to allow water to be treated to flow into the polisher, an inflow valve connected to the inflow line and upstream of the polisher, an outflow line configured to allow the water to be treated to flow out from the polisher, an outflow valve connected to the outflow line and at a downstream of the polisher, a connection line configured to connect the inflow line to the outflow line, a connection valve connected to the connection line, a first drain line connected to the polisher and at a higher vertical level than a vertical line of the inflow line, a first drain valve connected to the first drain line and downstream of the polisher, a plurality of sub-drain lines branched from the outflow line and connected to the first drain line, a plurality of sub-drain valves, connected to the plurality of sub-drain lines, respectively, a second drain line branched from the outflow line, a plurality of second drain valves connected to the second drain line, a third drain line branched from the second drain line and at a higher vertical level than a vertical level of the second drain line, a first discharge line branched from the second drain line and connected to the third drain line and a second discharge line branched from the first discharge line, and a first discharge valve and a second discharge valve, connected to the first discharge line and the second discharge line, respectively, wherein the inflow valve, the outflow valve, the first drain valve, the plurality of sub-drain valves, the plurality of second drain valves, the first discharge valve, and the second discharge valve are automatic valves, and the connection valve is a manual valve.

According to another aspect of the inventive concepts, there is provided a method of replacing an ion exchange resin including closing valves for preparing for replacement of the ion exchange resin filled in a polisher, draining materials inside the polisher, replacing the ion exchange resin, cleaning the replaced ion exchange resin, and preparing for an operation of the polisher, wherein the cleaning of the replaced ion exchange resin includes filling the polisher with water, performing a first cleaning process of cleaning the replaced ion exchange resin, and performing a second cleaning process of cleaning the ion exchange resin, and wherein the draining, the cleaning, and the preparing are performed by an operation of an automatic valve.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF EXAMPLE EMBODIMENTS

Figure 1:
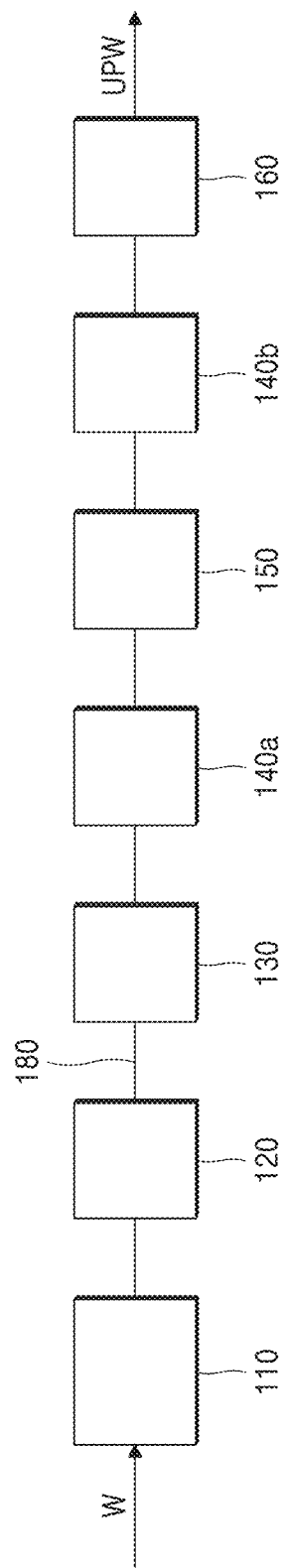
FIG. 1 is a block diagram schematically illustrating an ultrapure water (UPW) production facility according to example embodiments.

Hereinafter, example embodiments of the inventive concepts will be described in detail with reference to the accompanying drawings. The same reference numerals are used for the same components in the drawings, and redundant descriptions thereof are omitted.

FIG. 1 is a block diagram schematically illustrating an ultrapure water (UPW) production facility 100 according to example embodiments.

Referring to FIG. 1, the UPW production facility 100 may include a tank 110 configured to store water to be treated W, a heat exchanger 120, an ultraviolet sterilizer 130, a first polisher 140a, a degasifier 150, a second polisher 140b, and/or a filtration membrane 160. In some example embodiments, the tank 110 configured to store the water to be treated W, the heat exchanger 120, the ultraviolet sterilizer 130, the first polisher 140a, the degasifier 150, the second polisher 140b, and/or the filtration membrane 160 may be sequentially disposed on a supply line 180.

The tank 110 configured to store the water to be treated W may store water to be treated W for a certain period of time. Accordingly, time for the treatment of the water to be treated W in the subsequent devices 120, 130, 140, 150, 160, and 170 included in the UPW production facility 100 may be secured. A pump (not shown) may be further included in downstream of the tank 110 configured to store the water to be treated W. The water to be treated W stored in the tank 110 configured to store the water to be treated W may be moved to the heat exchanger 120 by the pump.

The heat exchanger 120 may be located downstream of the tank 110 configured to store the water to be treated W. The heat exchanger 120 may control the temperature of the water to be treated W supplied from the tank 110 configured to store the water to be treated W. Although one heat exchanger 120 is illustrated in FIG. 1, the inventive concepts are not limited thereto. For example, the UPW production facility 100 may include a plurality of heat exchangers 120, and each of the heat exchangers 120 may independently increase or decrease the temperature of the water to be treated W.

The ultraviolet sterilizer 130 may be located downstream of the heat exchanger 120. The ultraviolet sterilizer 130 may suppress microorganisms included in the water to be treated W and decompose organic matter remaining in the water to be treated W. For example, the ultraviolet sterilizer 130 may irradiate ultraviolet rays having a wavelength of about 185 nm to the water to be treated W, and the organic matter remaining in the water to be treated W may be decomposed into carbon dioxide gas and organic acid by the ultraviolet rays.

The first polisher 140a may be located downstream of the ultraviolet sterilizer 130. In some example embodiments, the first polisher 140a may be an ion exchange resin tower filled with an ion exchange resin as a catalyst. In some example embodiments, the first polisher 140a may remove hydrogen peroxide included in the water to be treated W. Hydrogen peroxide may be decomposed into water and oxygen by the ion exchange resin as the catalyst.

The degasifier 150 may be located downstream of the first polisher 140a. The degasifier 150 may remove $CO_2$ and dissolved oxygen remaining in the water to be treated W. In some example embodiments, the degasser 150 may be a membrane degasifier (MDG). In some example embodiments, the degasifier 150 may use, for example, a hollow fiber type gas separation membrane, but is not limited thereto.

The second polisher 140b may be located downstream of the degasifier 150. In some example embodiments, the second polisher 140b may be an ion exchange resin tower filled with a mixed bed type ion exchange resin. In some example embodiments, the second polisher 140b may remove various cations and various anions included in the water to be treated W passing through the second polisher 140b.

The filtration membrane 160 may be located downstream of the second polisher 140b. The filtration membrane 160 may remove various particles remaining in the water to be treated W. In some example embodiments, the filtration membrane 160 may be an ultrafiltration membrane. The filtration membrane 160 may include a material selected from, for example, polysulfone, polypropylene, polyethylene, polyacrylonitrile, and polyamide. The filtration membrane 160 may be formed in, for example, a hollow fiber type, a tubular type, or a flat plate type, and may be formed to have pores having a diameter equal to or less than 0.01 Several particles remaining in the water to be treated W are treated by the filtration membrane 160, and thus the water to be treated W passing through the filtration membrane 160 becomes UPW, and is supplied to a semiconductor production facility (not shown) through the supply line 180.

Figure 2:
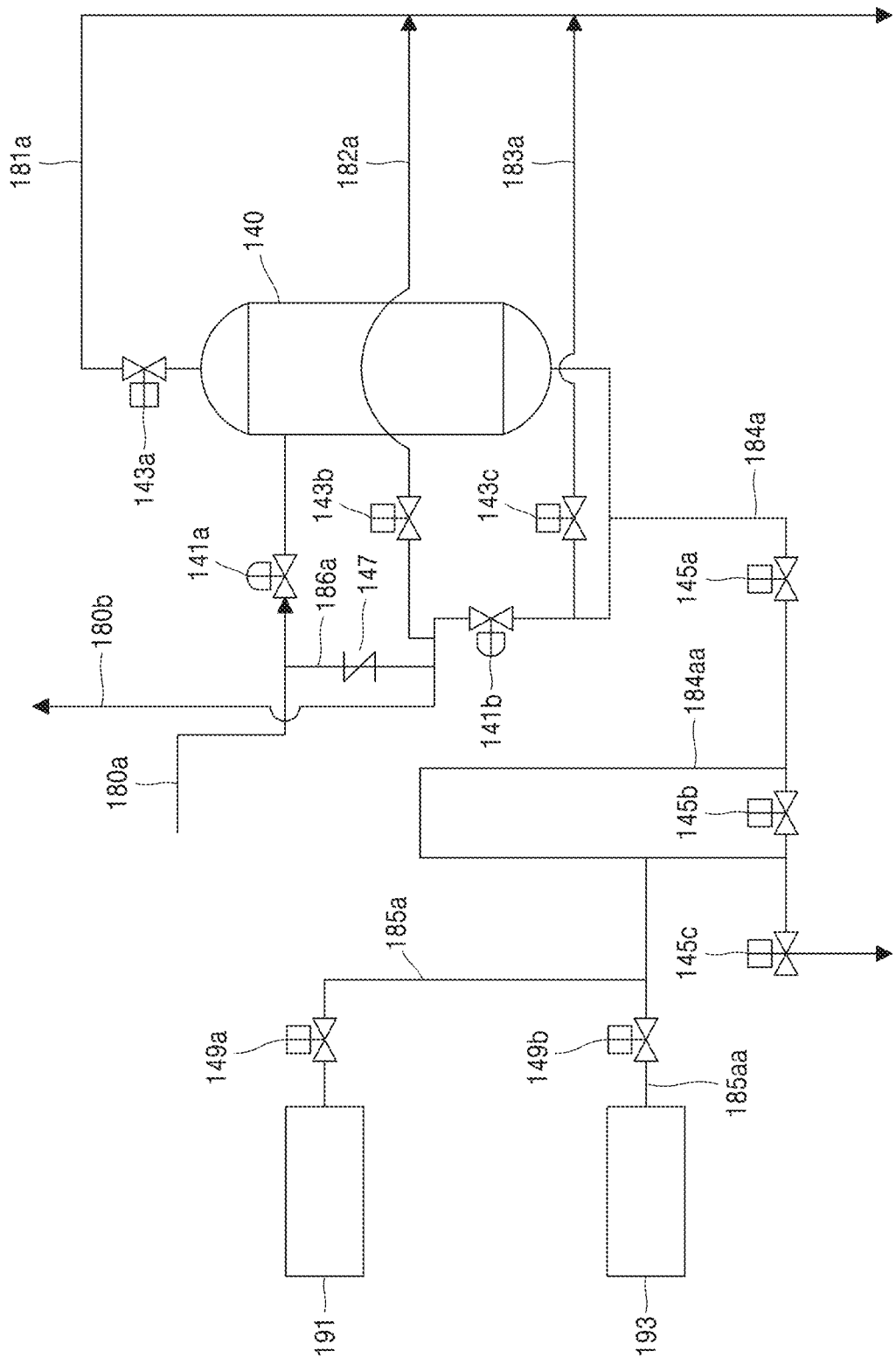
FIG. 2 is a block diagram illustrating a part of the UPW production facility according to example embodiments.

FIG. 2 is a block diagram illustrating a part of the UPW production facility 100 according to example embodiments.

Referring to FIG. 2, the UPW production facility 100 (see FIG. 1) may include a polisher 140, an inflow line 180a, an inflow valve 141a, an outflow line 180b, an outflow valve 141b, a first drain line 181a, first drain valve 143a, a second drain line 184a, second drain valves 145a, 145b, and 145c, a first discharge line 185a, a second discharge line 185aa, a first discharge valve 149a, and/or a second discharge valve 149b.

The polisher 140 may be, for example, any one of the first polisher 140a and the second polisher 140b described with reference to FIG. 1.

The inflow line 180a may be connected to the polisher 140 and configured to allow water to be treated to flow into the polisher 140.

The inflow valve 141a may be connected to the inflow line 180a and located upstream of the polisher 140. According to the opening and closing of the inflow valve 141a, the inflow of the water to be treated into the polisher 140 may be controlled.

The outflow line 180b may be connected to the polisher 140, and configured to allow the water to be treated to flow out from the polisher 140.

The outflow valve 141b may be connected to the outflow line 180b and located downstream of the polisher 140. According to the opening and closing of the outflow valve 141b, the outflow of the water to be treated from the polisher 140 may be controlled.

In some example embodiments, the inflow valve 141a and the outflow valve 141b may be control valves. Accordingly, the inflow valve 141a and the outflow valve 141b may be controlled by a control device (not shown) to be wholly or partially opened. The inflow valve 141a and the outflow valve 141b may be partially opened and closed, and thus flow rates of the water to be treated flowing into the polisher 140 and the water to be treated flowing from the polisher 140 may be adjusted.

The first drain line 181a may be connected to the polisher 140 and a first drain (not shown). Materials in the polisher 140 may be discharged to the first drain through the first drain line 181a. In some example embodiments, the first drain line 181a may be connected to an upper portion of the polisher 140. Accordingly, air in the polisher 140 may be discharged through the first drain line 181a.

The first drain valve 143a may be connected to the first drain line 181a and located downstream of the polisher 140. In a process of cleaning an ion exchange resin of the polisher 140, materials such as water and air inside the polisher 140 may be discharged to the first drain according to the opening and closing of the first drain valve 143a.

The second drain line 184a may branch from the outflow line 180b. The second drain line 184a may be connected to a second drain (not shown). The materials in the polisher 140 may be discharged to the second drain through the second drain line 184a.

The second drain valves 145a, 145b, and 145c may be connected to the second drain line 184a and located downstream of the polisher 140. In the process of cleaning the ion exchange resin of the polisher 140, the materials such as water and air inside the polisher 140 may be discharged to the second drain according to the opening and closing of the second drain valves 145a, 145b, and 145c.

In some example embodiments, a diameter of the first drain line 181a may be smaller than a diameter of the second drain line 184a. Accordingly, when cleaning water of a relatively large flow rate is discharged, the cleaning water may be discharged through the second drain line 184a, and when the cleaning water of a relatively small flow rate is discharged, the cleaning water may be discharged through the first drain line 181a.

In some example embodiments, the UPW production facility 100 may further include a third drain line 184aa branched from the second drain line 184a and connected to the first discharge line 185a. The third drain line 184aa may be located at a higher vertical level than that of the second drain line 184a. Accordingly, when the midstream second drain valve 145b is opened, the materials discharged from the polisher 140 are discharged directly to the second drain along the second drain line 184a without via the third drain line 184aa, but when the midstream second drain valve 145b is closed, the materials discharged from the polisher 140 are discharged to the second drain along the second drain line 184a via the third drain line 184aa. Accordingly, a water level inside the polisher 140 may be adjusted according to whether the midstream second drain valve 145b is opened or closed.

The first discharge line 185a may be branched from the second drain line 184a and connected to the first tank 191. The process of cleaning the ion exchange resin of the polisher 140 which will be described below may be discharged to the first tank 191 through the first discharge line 185a.

The first discharge valve 149a may be provided on the first discharge line 185a. Discharge of the cleaning water to the first tank 191 may be controlled by opening and closing the first discharge valve 149a.

In some example embodiments, the UPW production facility 100 may further include a second discharge line 185aa. The second discharge line 185aa may be branched from the first discharge line 185a and connected to the second tank 193. The cleaning water may be discharged to the second tank 193 through the second discharge line 185aa.

In some example embodiments, the second discharge valve 149b may be connected to the second discharge line 185aa. Discharge of the cleaning water to the second tank 193 may be controlled by opening and closing the second discharge valve 149b.

The first tank 191 may be, for example, a wastewater storage tank configured to store non-recyclable wastewater. According to the quality of the cleaning water, cleaning water to be discarded through a separate purifier may be discharged to the first tank 191 according to the opening of the first discharge valve 149a.

The second tank 193 may be, for example, a wastewater storage tank configured to store recyclable wastewater. According to the quality of the cleaning water, cleaning water to be recycled through a separate recovery facility may be discharged to the second tank 193 according to the opening of the second discharge valve 149b, and recovered through the separate recovery facility and then recycled later.

In some example embodiments, the UPW production facility 100 may further include a first sub-drain line 182a branched from the outflow line 180b, a second sub-drain line 183a branched from the outflow line 180b, a first sub-drain valve 143b connected to the first sub-drain line 182a, and a second sub-drain valve 143c connected to the second sub-drain line 183a.

The first sub-drain line 182a may be branched from the outflow line 180b downstream of the outflow valve 141b and connected to the first drain line 181a. The first sub-drain line 182a may be located at a higher vertical level than that of the outflow line 180b.

The first sub-drain valve 143b may be connected to the first sub-drain line 182a. According to the opening and closing of the first sub-drain valve 143b, discharge of cleaning water to the first drain line 181a via the first sub-drain line 182a may be controlled.

The second sub-drain line 183a may be branched from the outflow line 180b upstream of the outflow valve 141b and connected to the first drain line 181a. The second sub-drain line 183a may be located at a lower vertical level than that of the outflow line 180b.

The second sub-drain valve 143c may be connected to the second sub-drain line 183a. According to the opening and closing of the second sub-drain valve 143c, the discharge of cleaning water to the first drain line 181a via the second sub-drain line 183a may be controlled.

The UPW production facility 100 may further include the first sub-drain line 182a and the second sub-drain line 183a, and thus, in the process of cleaning the ion exchange resin which will be described below, the materials inside the polisher 140 may be discharged more quickly and the cleaning water used to clean the ion exchange resin may be discharged more quickly. Accordingly, the process of cleaning the ion exchange resin may be performed more quickly.

In some example embodiments, the UPW production facility 100 may further include a connection line 186a connecting the inflow line 180a and the outflow line 180b, and a connection valve 147 connected to the connection line 186a. In some example embodiments, the connection valve 147 may be a manual valve. The connection valve 147 generally remains closed, and may be opened to bypass the polisher 140 only when a problem occurs with the polisher 140. In some example embodiments, the inflow valve 141a and the outflow valve 141b may be closed.

In some example embodiments, the inflow valve 141a, the outflow valve 141b, the first drain valve 143a, the first sub-drain valves 143b, the second sub-drain valve 143c, and the second drain valves 145a, 145b, and 145c, the first discharge valve 149a, and the second discharge valve 149b may be automatic valves. Accordingly, in the process of replacing and cleaning the ion exchange resin described with reference to FIG. 4, various errors that may occur while the operator manually performs the process may be reduced or prevented, and the various errors may be reduced or prevented, and thus the quality of the UPW treated by the ion exchange resin may be improved.

Figure 3:
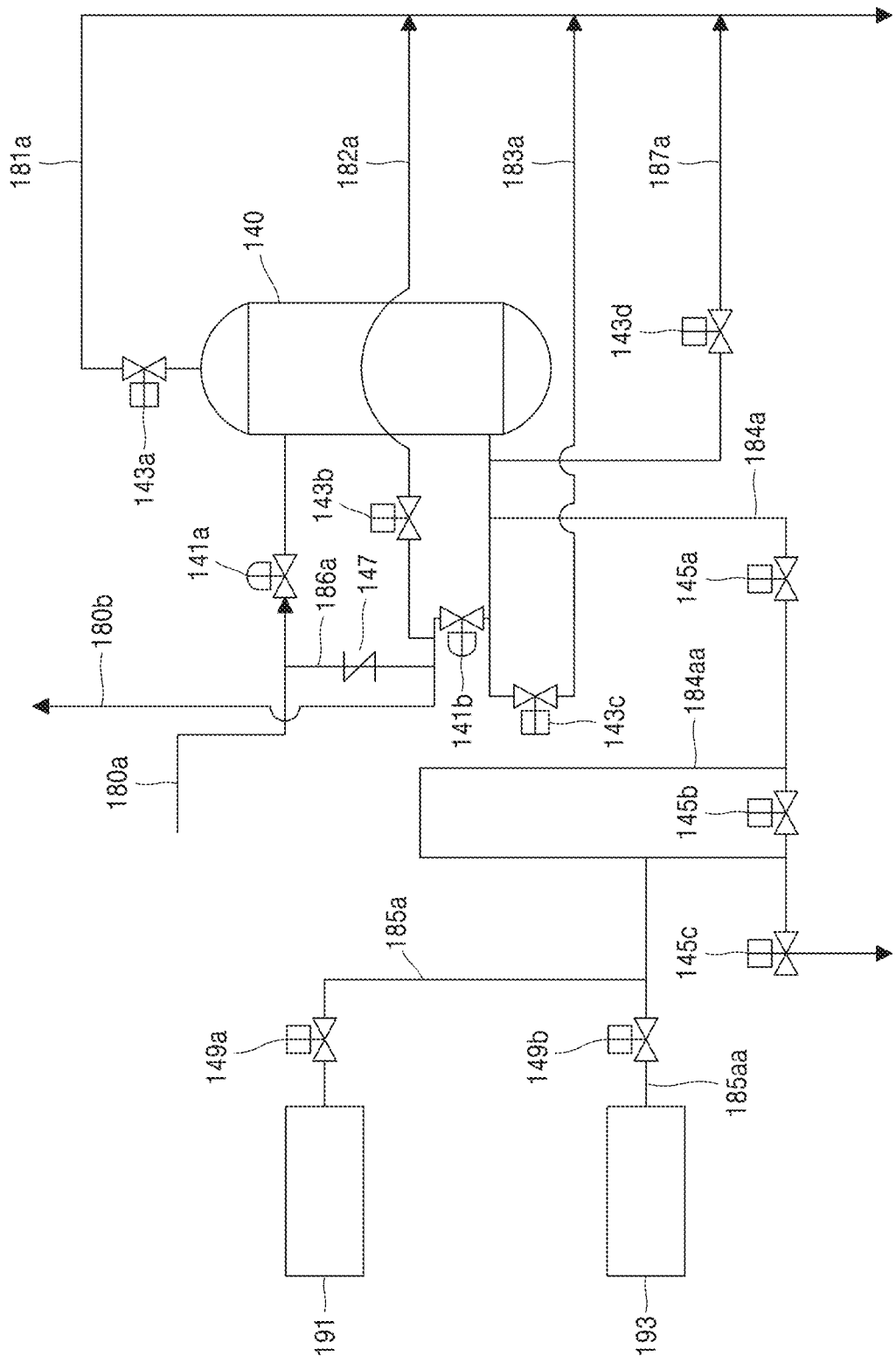
FIG. 3 is a block diagram illustrating a part of the UPW production facility according to example embodiments.

FIG. 3 is a block diagram illustrating a part of the UPW production facility 100 (see FIG. 1) according to example embodiments. The polisher 140, the lines 180a, 180b, 181a, 182a, 183a, 184a, 184aa, 185a, 185aa, and 186a, the valves 141a, 141b, 143a, 143b, 143c, 145a, 145b, 145c, 147, 149a, and 149b, and the tanks 191 and 193 of the UPW production facility 100 shown in FIG. 3 are respectively similar to the polisher 140, the lines 180a, 180b, 181a, 182a, 183a, 184a, 184aa, 185a, 185aa, and 186a, the valves 141a, 141b, 143a, 143b, 143c, 145a, 145b, 145c, 147, 149a, and 149b, and the tanks 191 and 193 of the UPW production facility 100 described with reference to FIG. 2, and thus differences therebetween will be mainly described below.

In some example embodiments, the UPW production facility 100 (see FIG. 1) may further include a third sub-drain line 187a and a third sub-drain valve 143d.

The third sub-drain line 187a may be branched from the outflow line 180b upstream of the outflow valve 141b and connected to the first drain line 181a. The third sub-drain line 187a may be located at a lower vertical level than those of the outflow line 180b and the second sub-drain line 183a.

The third sub-drain valve 143d may be connected to the third sub-drain line 187a. According to the opening and closing of the third sub-drain valve 143d, cleaning water may or may not be discharged to the first drain line 181a via the third sub-drain line 187a.

The UPW production facility 100 may further include the third sub-drain line 187a, and thus, in a process of cleaning an ion exchange resin which will be described below, materials inside the polisher 140 may be discharged more quickly and the cleaning water used to clean the ion exchange resin may be discharged more quickly. Accordingly, the process of cleaning the ion exchange resin may be performed more quickly.

Figure 4:
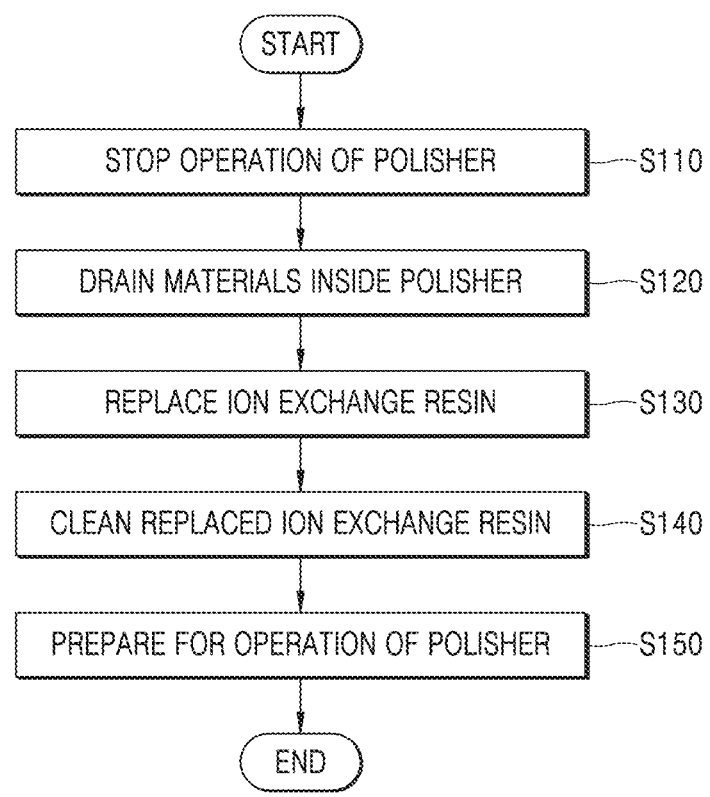
FIG. 4 is a flowchart illustrating a method of replacing an ion exchange resin according to example embodiments.

FIG. 4 is a flowchart illustrating a method S100 of replacing an ion exchange resin according to example embodiments.

Referring to FIG. 4, the method S100 of replacing the ion exchange resin may include operation S110 of stopping an operation of the polisher 140, operation S120 of draining materials inside the polisher 140, operation S130 of replacing the ion exchange resin filled in the polisher 140, operation S140 of cleaning the replaced ion exchange resin, and operation S150 of preparing for the operation of the polisher 140.

Referring to FIGS. 3 and 4 together, operation S110 of stopping the operation of the polisher 140 may include closing the outflow valve 141b and closing the inflow valve 141a. When the polisher 140 operates, the inflow valve 141a and the outflow valve 141b remain completely opened, and the remaining valves 143a, 143b, 143c, 145a, 145b, 145c, 149a, and 149b remain closed. In order to stop the operation of the polisher 140, the completely opened outflow valve 141b may be firstly gradually closed for a certain period of time. For example, the completely opened outflow valve 141b may be gradually closed for a time of about 10 minutes, and then completely closed. When the outflow valve 141b is gradually closed, damage to subsequent UPW production devices included in the UPW production facility 100 (see FIG. 1) may be reduced or prevented. Next, the completely opened inflow valve 141a may be gradually closed for a certain period of time. For example, the completely opened inflow valve 141a may be gradually closed for about 10 minutes, and then completely closed, but is not limited thereto.

Operation S120 of draining the materials inside the polisher may include opening the first drain valve 143a and opening the second drain valves 145a, 145b, and 145c. The materials inside the polisher 140 may be, for example, air inside the polisher 140, water to be treated remaining in the polisher 140, etc. First, the first drain valve 143a is opened, so that the air in the polisher 140 may be discharged through the first drain line 181a. Next, the second drain valves 145a, 145b, and 145c are opened, so that the water to be treated remaining in the polisher 140 may be discharged through the second drain line 184a. The first drain valve 143a and the second drain valves 145a, 145b, and 145c may be sequentially opened by a control device (not shown). Accordingly, various errors such as a process time error and a valve erroneous operation that may occur when the first drain valve 143a and the second drain valves 145a, 145b, and 145c are opened by a manual operation of an operator may be reduced or prevented.

In some example embodiments, operation S120 of draining the materials inside the polisher 140 may be performed for a certain period of time selected in the range of about 25 minutes to about 35 minutes. For example, operation S120 of draining the materials inside the polisher 140 may be performed for about 30 minutes with the first drain valve 143a and the second drain valves 145a, 145b, and 145c opened.

After operation S120 is performed, operation S130 of replacing the ion exchange resin filled in the polisher 140 may be performed. Prior to operation S130 of replacing the ion exchange resin filled in the polisher 140, the opened first drain valve 143a and the second drain valves 145a, 145b and 145c may be closed again.

After operation S130 is performed, operation S140 of cleaning the replaced ion exchange resin may be performed. Operation S140 of cleaning the replaced ion exchange resin may include an operation of filling the polisher 140 with water, an operation of performing a first cleaning process, and an operation of performing a second cleaning process.

The operation of filling the polisher 140 with water may be performed by opening the sub-drain valves 143c and 143d located upstreams of the inflow valve 141a, the first drain valve 143a, and the outflow valve 141b. The first drain valve 143a and the sub-drain valves 143c and 143d may be opened, and thus, air inside the polisher 140 may be discharged, and the inflow valve 141a may be opened to fill the polisher 140 with water.

In some example embodiments, the inflow valve 141a may be partially open. For example, assuming that a completely opened state is a 100% open state, the inflow valve 141a may be opened up to a value selected in the range of about 10% to about 15%. In some example embodiments, the inflow valve 141a may gradually opened. For example, the inflow valve 141a is opened by about 5% for every elapsed time of about 1 minute, and may be opened only up to a value selected from the range of about 10% to about 15%.

In some example embodiments, the operation of filling the polisher 140 with water may be performed for about 30 minutes to about 40 minutes, but is not limited thereto.

After the operation of filling the polisher 140 with water is performed, the first drain valve 143a, the sub-drain valves 143c and 143d, and the inflow valve 141a may be closed. The inflow valve 141a may be gradually closed. For example, the inflow valve 141a may be closed by about 5% for every elapsed time of about 1 minute.

The operation of performing the first cleaning process may be performed after the operation of filling the polisher 140 with water. The operation of performing the first cleaning process may be performed by opening the inflow valve 141a, the first drain valve 143a, the sub drain valves 143c and 143d located upstream of the outflow valve 141b, the upstream second drain valve 145*a*, and the first discharge valve 149*a*. Air inside the polisher 140 may be discharged by opening the first drain valve 143*a*, part of the first cleaning water used to clean the ion exchange resin may be discharged to a first drain (not shown) by opening the sub-drain valves 143*c* and 143*d*, the first cleaning water may be supplied to the polisher 140 by opening the first inflow valve 141*a*, and the other part of the first cleaning water used to clean the ion exchange resin may be discharged to the first tank 191 by opening the first discharge valve 149*a*.

In some example embodiments, the inflow valve 141*a* may be only partially opened. For example, assuming that a completely opened state is a 100% opened state, the inflow valve 141*a* may be opened only up to a value selected from the range of about 20% to about 25%. In some example embodiments, the inflow valve 141*a* may be gradually opened. For example, the inflow valve 141*a* may be opened by about 10% for every elapsed time of about 1 minute, and may be opened only to a value selected from the range of about 20% to about 25%.

In some example embodiments, the operation of performing the first cleaning process may be performed for about 5 minutes to about 10 minutes, but is not limited thereto.

In some example embodiments, the first drain valve 143*a* may be opened only in a part of the operation of performing the first cleaning process. For example, when the first cleaning process is performed for about 10 minutes, the first drain valve 143*a* may be opened for about 2 minutes and closed for about 8 minutes.

Between the opened upstream second drain valve 145*a* and the closed midstream second drain valve 145*b*, an amount of total organic carbon (TOC) included in the first clean water used to clean the ion exchange resin may be measured. When the amount of the measured TOC falls below a certain level, the second cleaning process may be performed.

The operation of performing the second cleaning process is similar to the operation of performing the first cleaning process, and thus differences therebetween will be mainly described below.

The operation of performing the second cleaning process may be performed when the inflow valve 141*a*, the first drain valve 143*a*, the sub drain valves 143*c* and 143*d* located upstream of the outflow valve 141*b*, and the upstream second drain valve 145*a* which are opened in the operation of performing the first cleaning process remain opened, the first discharge valve 149*a* is closed, and the second discharge valve 149*b* is opened.

In some example embodiments, the operation of performing the second cleaning process may be performed for about 5 minutes, but is not limited thereto.

In the second cleaning process, the second cleaning water supplied to the polisher 140 through the inflow valve 141*a* to clear the ion exchange resin may be discharged to the second tank 193. Because the second cleaning process is performed when the amount of TOC included in the first cleaning water used to clean the ion exchange resin falls below a certain level, the second cleaning water used to clean the ion exchange resin includes a smaller amount of TOC that that of the first cleaning water. Accordingly, the second cleaning water used to clean the ion exchange resin may be discharged to the second tank 193, treated through a separate recovery facility and recycled.

Between the opened upstream second drain valve 145*a* and the closed midstream second drain valve 145*b*, the amount of TOC and the amount of dissolved oxygen included in the second cleaning water used to clean the ion exchange resin may be measured. When the measured amount of TOC and the amount of dissolved oxygen fall below a certain level, operation S140 may end, and operation S150 of preparing for the operation of the polisher 140 may be performed. Through such measurement operation, the quality of UPW treated by the replaced ion exchange resin may be secured.

Operation S150 of preparing for the operation of the polisher 140 may include a first preparation operation, a second preparation operation, and a third preparation operation that are sequentially performed.

In some example embodiments, operation S150 of preparing for the operation of the polisher 140 may be performed for a certain period of time selected in the range of about 5 minutes to about 10 minutes, but is not limited thereto.

In the first preparation operation, first, the inflow valve 141*a*, the first drain valve 143*a*, and the sub-drain valves 143*c* and 143*d* located upstream of the outflow valve 141*b* that are opened in operation S140 may be sequentially closed, and the sub-drain valve 143*b* located downstream of the outflow valve 141*b* may be opened. In some example embodiments, the inflow valve 141*a* may be gradually closed. For example, the inflow valve 141*a* may close by about 10% for every elapsed time of about one minute. Next, the upstream second drain valve 145*a* may be closed and the second discharge valve 149*b* may be closed sequentially. Thereafter, in the first preparation operation, water may flow backward through the outflow line 180*b* and then flow in. At this time, because the outflow valve 141*b* is completely closed, the water that flows backward does not flow in the second sub-drain line 183*a* and the third sub-drain line 187*a* located upstream of the outflow valve 141*b*, and flows only in the first sub-drain line 182*a* located downstream of the outflow valve 141*b*. Accordingly, the first sub-drain line 182*a* may be cleaned by the water that flows backward. After that, the second preparation operation may be performed.

In the second preparation operation, the inflow valve 141*a*, the first drain valve 143*a*, and the sub-drain valves 143*c* and 143*d* located upstream of the outflow valve 141*b* may be opened. In some example embodiments, the inflow valve 141*a* may be gradually opened. For example, the inflow valve 141*a* may be opened by about 10% for every elapsed time of about 1 minute. Through the second preparation operation, air inside the polisher 140 that has not been discharged through the first drain line 181*a* may be discharged to the first drain, and materials such as air and water that have not been discharged from the outflow line 180*b* corresponding to the upstream of outflow valve 141*b* may be discharged to the first drain via the second sub-drain line 183*a* and the third sub-drain line 187*a*.

Thereafter, in the third preparation operation, the opened first drain valve 143*a* and the sub-drain valves 143*b*, 143*c*, and 143*d* may be closed. After the third preparation operation, the polisher 140 may operate again, and thus water to be treated passing through the polisher 140 may be treated by the ion exchange resin inside the polisher 140.

While the inventive concepts have been particularly shown and described with reference to example embodiments thereof, it will be understood that various changes in form and details may be made therein without departing from the spirit and scope of the following claims.

What is claimed is:

1. A water production facility comprising:
a polisher configured to be filled with an ion exchange resin;

an inflow line configured to allow water to be treated to flow into the polisher;

an inflow valve connected to the inflow line and upstream of the polisher;

an outflow line configured to allow water to be treated to flow out from the polisher;

an outflow valve connected to the outflow line and downstream of the polisher;

a sub-drain line branched from the outflow line;

a sub-drain valve connected to the sub-drain line;

a first drain line connected to the polisher;

a first drain valve connected to the first drain line and downstream of the polisher;

a second drain line branched from the outflow line;

a second drain valve connected to the second drain line;

a discharge line branched from the second drain line; and a discharge valve connected to the discharge line, wherein the inflow valve, the outflow valve, the first drain valve, the second drain valve, and the discharge valve are automatic valves.

2. The water production facility of claim 1, further comprising a connection line configured to connect the inflow line and the outflow line to a connection valve connected to the connection line.

3. The water production facility of claim 2, wherein the connection valve is a manual valve.

4. The water production facility of claim 1, wherein the sub-drain valve is an automatic valve.

5. The water production facility of claim 1, wherein the sub-drain line comprises a first sub-drain line branched from upstream of the outflow valve, a first sub-drain valve connected to the first sub-drain line, a second sub-drain line branched from downstream of the outflow valve, and a second sub-drain valve connected to the second sub-drain line, wherein the first sub-drain valve and the second sub-drain valve are automatic valves.

6. The water production facility of claim 5, wherein the sub-drain line further comprises a third sub-drain line branched from upstream of the outflow valve and a third sub-drain valve connected to the third sub-drain line, wherein the third sub-drain valve is an automatic valve.

7. The water production facility of claim 1, wherein the inflow valve and the outflow valve are control valves.

8. The water production facility of claim 1, wherein a diameter of the first drain line has a smaller value than a value of a diameter of the second drain line.

9. A water production facility comprising:

a polisher configured to be filled with an ion exchange resin;

an inflow line configured to allow water to be treated to flow into the polisher;

an inflow valve connected to the inflow line and upstream of the polisher;

an outflow line configured to allow the water to be treated to flow out from the polisher;

an outflow valve connected to the outflow line and downstream of the polisher;

a connection line configured to connect the inflow line and the outflow line;

a connection valve connected to the connection line;

a first drain line connected to the polisher and at a higher vertical level than a vertical level of the inflow line;

a first drain valve connected to the first drain line and downstream of the polisher;

a plurality of sub-drain lines branched from the outflow line and connected to the first drain line;

a plurality of sub-drain valves, connected to the plurality of sub-drain lines, respectively;

a second drain line branched from the outflow line;

a plurality of second drain valves connected to the second drain line;

a third drain line branched from the second drain line and at a higher vertical level than a vertical level of the second drain line;

a first discharge line branched from the second drain line and connected to the third drain line and a second discharge line branched from the first discharge line; and a first discharge valve and a second discharge valve, connected to the first discharge line and the second discharge line, respectively, wherein the inflow valve, the outflow valve, the first drain valve, the plurality of sub-drain valves, the plurality of second drain valves, the first discharge valve, and the second discharge valve are automatic valves, and wherein the connection valve is a manual valve.

10. The water production facility of claim 9, wherein the plurality of sub-drain lines comprises a first sub-drain line branched downstream of the outflow valve and a second sub-drain line branched from upstream of the outflow valve, and the plurality of sub-drain valves comprises a first sub-drain valve connected to the first sub-drain line and a second sub-drain valve connected to the second sub-drain line.

11. The water production facility of claim 10, wherein the first sub-drain line is at a higher vertical level than a vertical level of the second sub-drain line.

12. The water production facility of claim 10, wherein the plurality of sub-drain lines further comprises a third sub-drain line branched from upstream of the outflow valve, at a lower vertical level than a vertical level of the first sub-drain line, and at a higher vertical level than a vertical level of the second sub-drain line.

13. A method of replacing an ion exchange resin, the method comprising:

closing a plurality of valves for preparing for replacement of the ion exchange resin in a polisher;

draining materials inside the polisher;

replacing the ion exchange resin;

cleaning the replaced ion exchange resin; and preparing for an operation of the polisher, wherein the cleaning of the replaced ion exchange resin comprises filling the polisher with first cleaning water, performing a first cleaning process of cleaning the replaced ion exchange resin with the first cleaning water, filling the polisher with second cleaning water, and performing a second cleaning process of cleaning the ion exchange resin with the second cleaning water, and wherein the draining, the cleaning, and the preparing are performed based on an operation of at least one automatic valve of the plurality of valves.

14. The method of claim 13, wherein the draining is performed for a period of time selected in a range of about 25 minutes to about 35 minutes.

15. The method of claim 13, wherein the filling the polisher with the first cleaning water and the second cleaning water is each performed for a period of time selected in a range of about 30 minutes to about 40 minutes.

16. The method of claim 13, further comprising measuring a concentration of total organic carbon (TOC) of the first cleaning water downstream of a second drain valve after the performing of the first cleaning process.

17. The method of claim 13, wherein the first cleaning process is performed for a period of time selected in a range of about 5 minutes to about 10 minutes.

18. The method of claim 13, further comprising measuring concentrations of TOC and dissolved oxygen in the second cleaning water downstream of a second drain valve after the performing of the second cleaning process.

19. The method of claim 13, wherein the preparing for the operation of the polisher comprises a first preparation operation, a second preparation operation, and a third preparation operation, and is performed for a period of time selected in a range of about 5 minutes to about 10 minutes.

* * * * *